United States Patent
Leebeeck

[11] Patent Number: 6,021,981
[45] Date of Patent: Feb. 8, 2000

[54] SADDLE HANGER FOR PLASTIC PIPE

[76] Inventor: Marcel De Leebeeck, 101/4 SOI 8, Maneeya House, Rattanatibet Road, Nonthaburi 11000, Thailand

[21] Appl. No.: 08/530,666

[22] Filed: Sep. 20, 1995

[51] Int. Cl.[7] .................................................. F16L 3/00
[52] U.S. Cl. ........................................... 248/58; 403/256
[58] Field of Search ................... 248/58, 72, 59, 248/60, 63, 74.4; 403/344, 256, DIG. 9

[56] References Cited

U.S. PATENT DOCUMENTS

| | | | |
|---|---|---|---|
| 1,737,214 | 11/1929 | Brown | 248/72 |
| 3,415,474 | 12/1968 | Kindorf | 248/62 |
| 3,572,623 | 3/1971 | Lapp | 248/72 |
| 4,019,705 | 4/1977 | Habuda, Sr. et al. | 248/72 X |
| 4,570,885 | 2/1986 | Heath | 248/72 |
| 5,007,604 | 4/1991 | Richards | 248/62 |
| 5,219,427 | 6/1993 | Harris | 248/59 |

*Primary Examiner*—Ramon O. Ramirez
*Attorney, Agent, or Firm*—Brian J. Coyne

[57] ABSTRACT

A saddle hanger for suspending a horizontal run of plastic pipe from any overhead structure, such as a horizontal I-beam. A U-shaped strap is provided having a longitudinal extent that is large compared to the diameter of the pipe that it supports, thereby substantially reducing droop in the pipe. The strap is formed by bending about a longitudinal axis a flat saddle blank. The saddle blank has two support portions oppositely and symmetrically disposed about a longitudinal axis and joined by a central rectangular portion. A transverse bolt inserted through apertures in the strap attaches the strap to a saddle hanger support bracket. The bracket is suspended by a hanger rod attached to the overhead structure. The saddle blank includes a pair of ears or clamp bases oppositely and symmetrically disposed about a lateral axis, said ears being partially separated from the central portion by a pair of oppositely-directed lateral slits, thereby defining laterally extending tabs. A pair of clamp covers is provided, each cover corresponding in plan view and end view to an ear that it overlies. Nut and bolt combinations attach the clamp covers to the ears, which together surround the pipe.

4 Claims, 5 Drawing Sheets

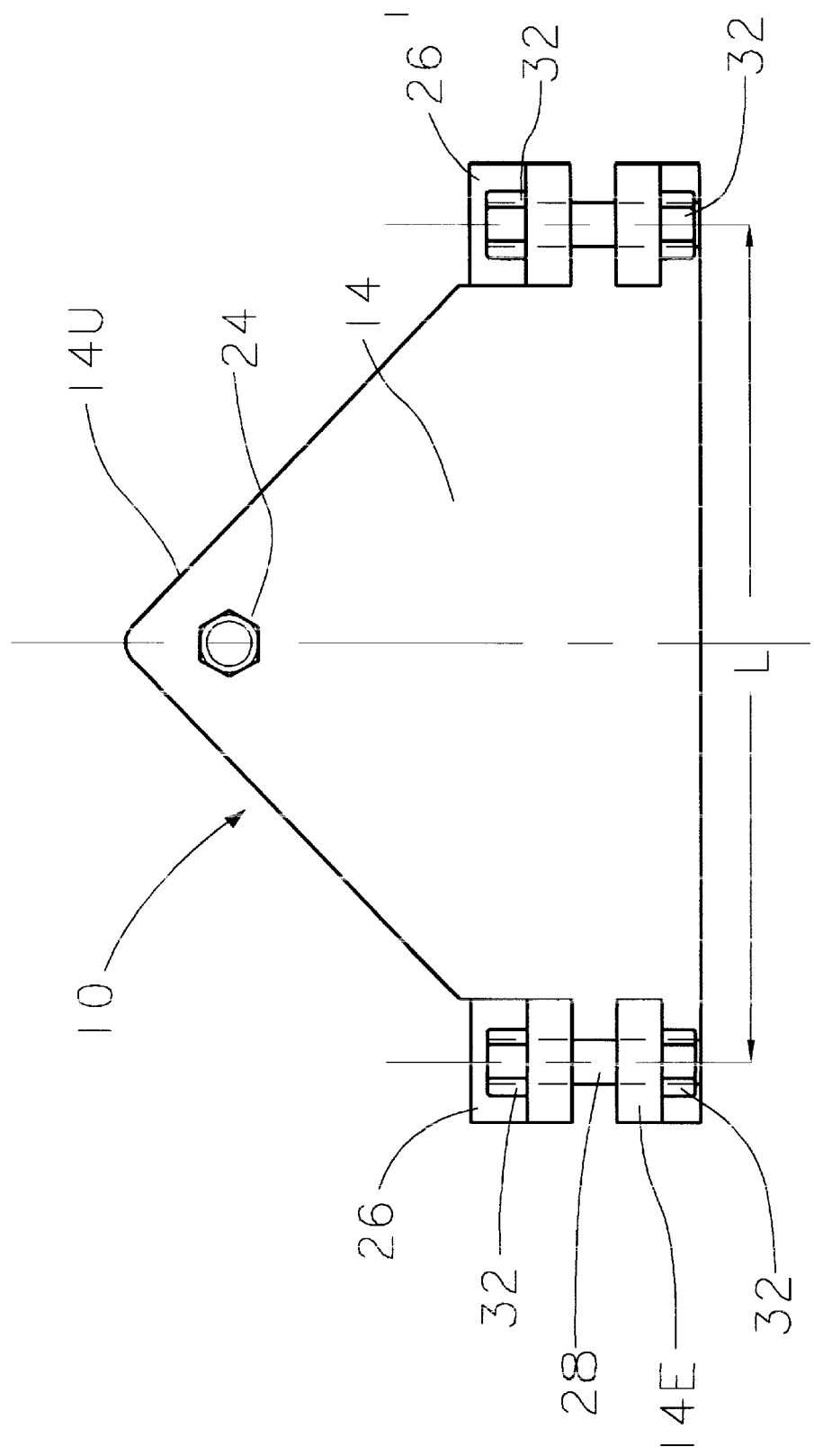

6,021,981

SADDLE HANGER FOR PLASTIC PIPE

TECHNICAL FIELD

This invention relates to pipe hangers and more particularly to pipe enclosing saddle hangers for suspending plastic pipe from overhead structures.

BACKGROUND ART

In chemical and other kinds of industrial processing plants, plastic pipe is commonly suspended from overhead structures, such as horizontal I beams supported by columns. One conventional method for suspending plastic pipe from an I beam has been to weld a horizontal angle iron extension to the beam, and attach a vertical hanger rod to the extension, which rod supported a clevis-type hanger through which plastic pipe was inserted. A wear plate was placed between a lower surface of the plastic pipe and the clevis to prevent excessive wear to the surface of the pipe. Compared to metal pipe, a run of plastic pipe requires supports at more frequent intervals in order to avoid excessive droop. For example, the recommended hanger spacing for a one-inch diameter carbon steel Schedule 40 pipe carrying water at 140 degrees F. is seven feet, compared to every 3.2 feet for the same fluid carried in a PVC Schedule 40 one-inch diameter pipe. See: Franklund, Thomas W., *Pipe Fitters and Welders Handbook* (Glencoe Publishing Co., Encino, Calif., 1984). Therefore, a greater number of such hangers distributed along a run of plastic pipe has been necessary to provide adequate support for a run of plastic pipe compared to a run of metal pipe.

The present invention, by providing a saddle hanger having a longitudinally extended, U-Shaped pipe support surface, significantly reduces the number of hangers required for a given run of plastic pipe, while at the same time minimizing the droop. With increased supporting surface, a wear plate is no longer required.

Kindorf, U.S. Pat. No. 3,415,474, described a hanger for insulated pipe comprising a U-shaped hanger strap supported by a clevis suspended by a threaded rod from an overhead structure. Richards, U.S. Pat. No. 5,007,604, disclosed a side load type pipe hanger comprising a generally C-shaped saddle including a pair of spaced apart arm portions and an interconnecting bight portion, and a support leg member connected to the saddle for suspending the hanger from an overhead structure. Neither Kindorf nor Richards, however, addressed the problem of droop in a run of plastic pipe, and neither taught the use of a longitudinally extended hanger strap to minimize droop.

Other pipe hanger systems known in the patent literature for suspending pipe from an I beam are disclosed by the following U.S. Pat. Nos. 1,737,214, granted Nov. 26, 1929, to S. Brown; U.S. Pat. No. 3,572,623, granted Mar. 30, 1971, to Chester A. Lapp; U.S. Pat. No. 4,019,705, granted Apr. 26, 1977, to Blair A. Habuda, Sr. et al.; and U.S. Pat. No. 4,570,885, granted Feb. 18, 1986, to Richard W. Heath. Again, however, none of these references teaches apparatus to minimize droop in a run of plastic pipe.

SUMMARY OF THE INVENTION

There remains, therefore, a need for a saddle hanger for suspending a run of plastic pipe from an overhead structure that will minimize the droop in the plastic pipe. Accordingly, it is an object of the present invention to provide saddle hangers for plastic pipe that when attached at suitable intervals to a horizontal I-beam will suspend the pipe therefrom and at the same time substantially reduce droop in the pipe. Another object is to provide such saddle hangers that will permit wider spacing between the hangers, and therefore require fewer hangers for a given run of plastic pipe, compared to similar prior art devices. Still further objects are to provide such saddle hangers that are simple in design, low in cost, and that can be rapidly and easily assembled and disassembled.

In accordance with the present invention, there is provided a saddle hanger for suspending plastic pipe from an overhead structure such as a horizontal I-beam, comprising a U-shaped strap formed by bending a flat saddle blank about a longitudinal axis, such that when a pipe is inserted within the strap the strap extends down one side of the pipe, underneath the pipe, and up the opposite side of the pipe. The saddle blank has two support portions longitudinally separated and joined by a central rectangular portion. The height or latitudinal extent of the central portion is chosen to be some suitable dimension, but greater than the outer circumference of the pipe that the hanger is intended to support. The width of the central portion, i.e., the longitudinal distance between the support portions, is chosen to be large enough so as to substantially minimize droop in the pipe. Each of the support portions has a pair of latitudinally spaced-apart, apertured ears for receiving fasteners such as bolts when a pipe rests within the strap. A clamp cover, which in plan view corresponds to an ear that it overlies in mating relationship, is placed over each ear and secured to the pipe and strap by said fasteners. A saddle hanger support bracket is provided for suspending the strap from a vertical hanger rod having one end connected to an I-beam clamp attached to an I-beam or other overhead structure and an opposite end connected to the bracket.

BRIEF DESCRIPTION OF THE DRAWING

Like reference numerals are used to designate like parts throughout the several views of the drawings, and:

FIG. 2 is an enlarged side elevational view thereof with the suspension means and pipe removed;

BEST MODE FOR CARRYING OUT THE INVENTION

Figure 1:
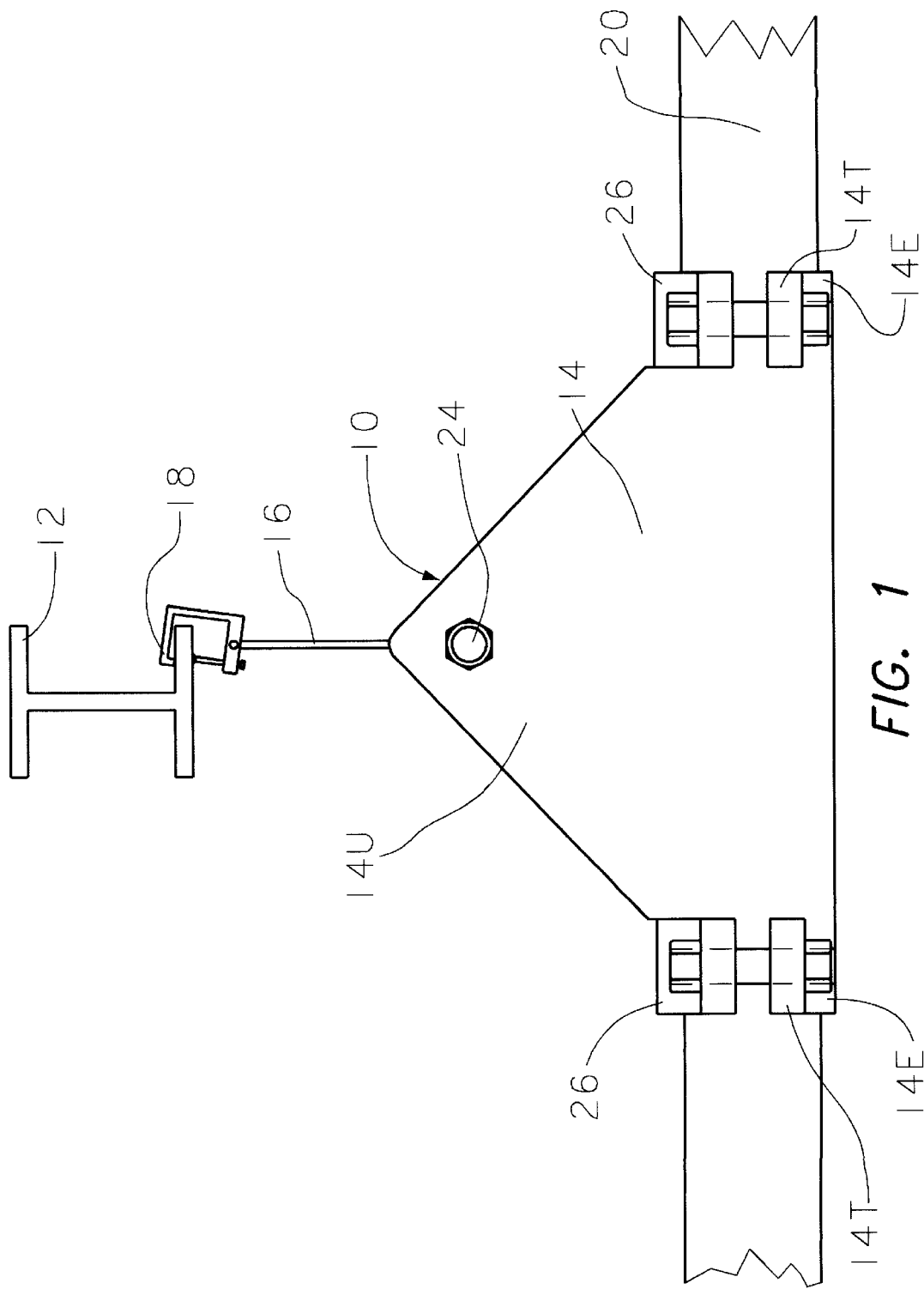
FIG. 1 is a side elevational view of an embodiment of the invention shown suspending a plastic pipe from a horizontal I-beam.
Figures 3, 4:
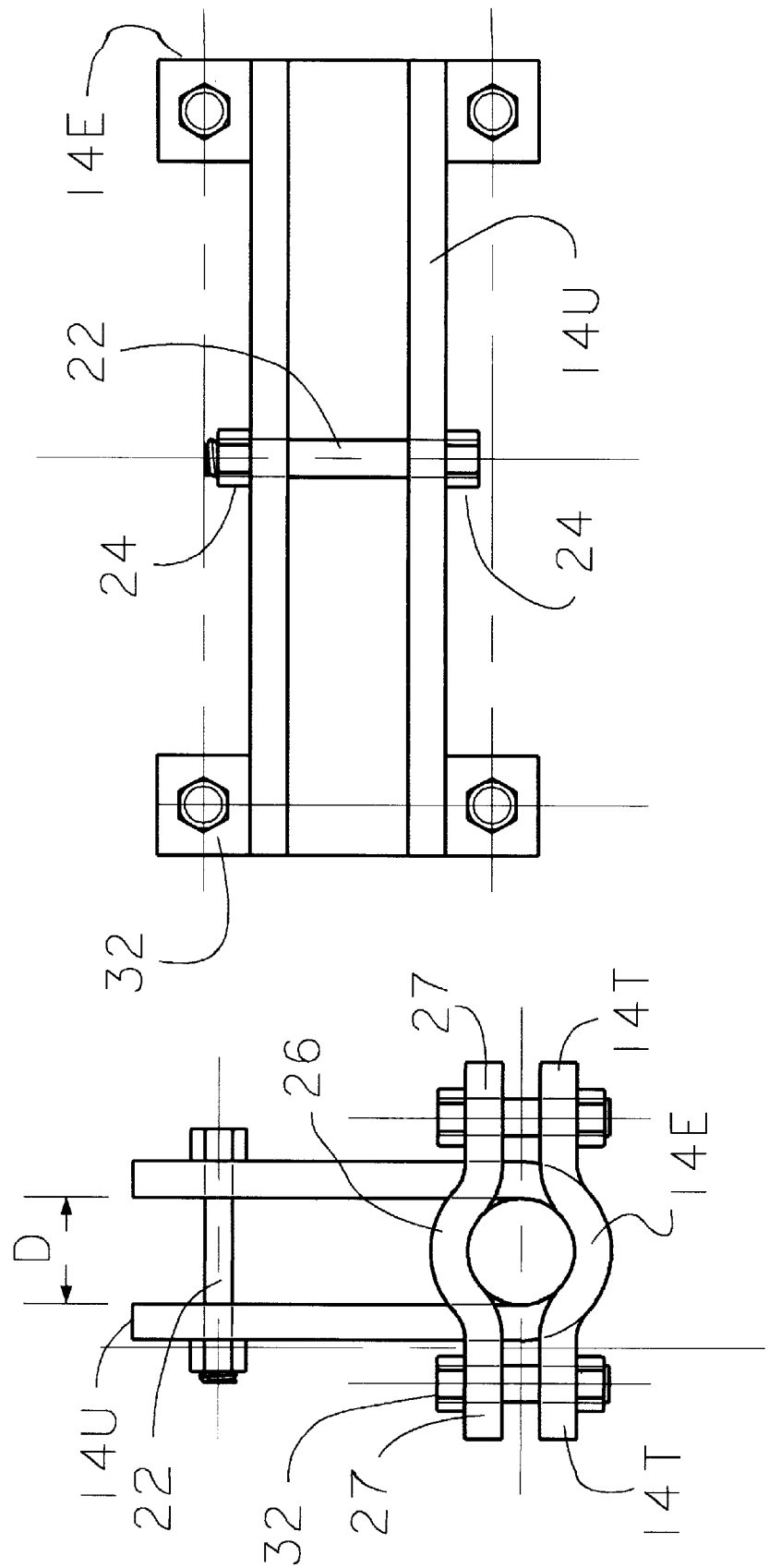
FIG. 3 is a front elevational view thereof.
FIG. 4 is a top plan view thereof.
Figure 5:
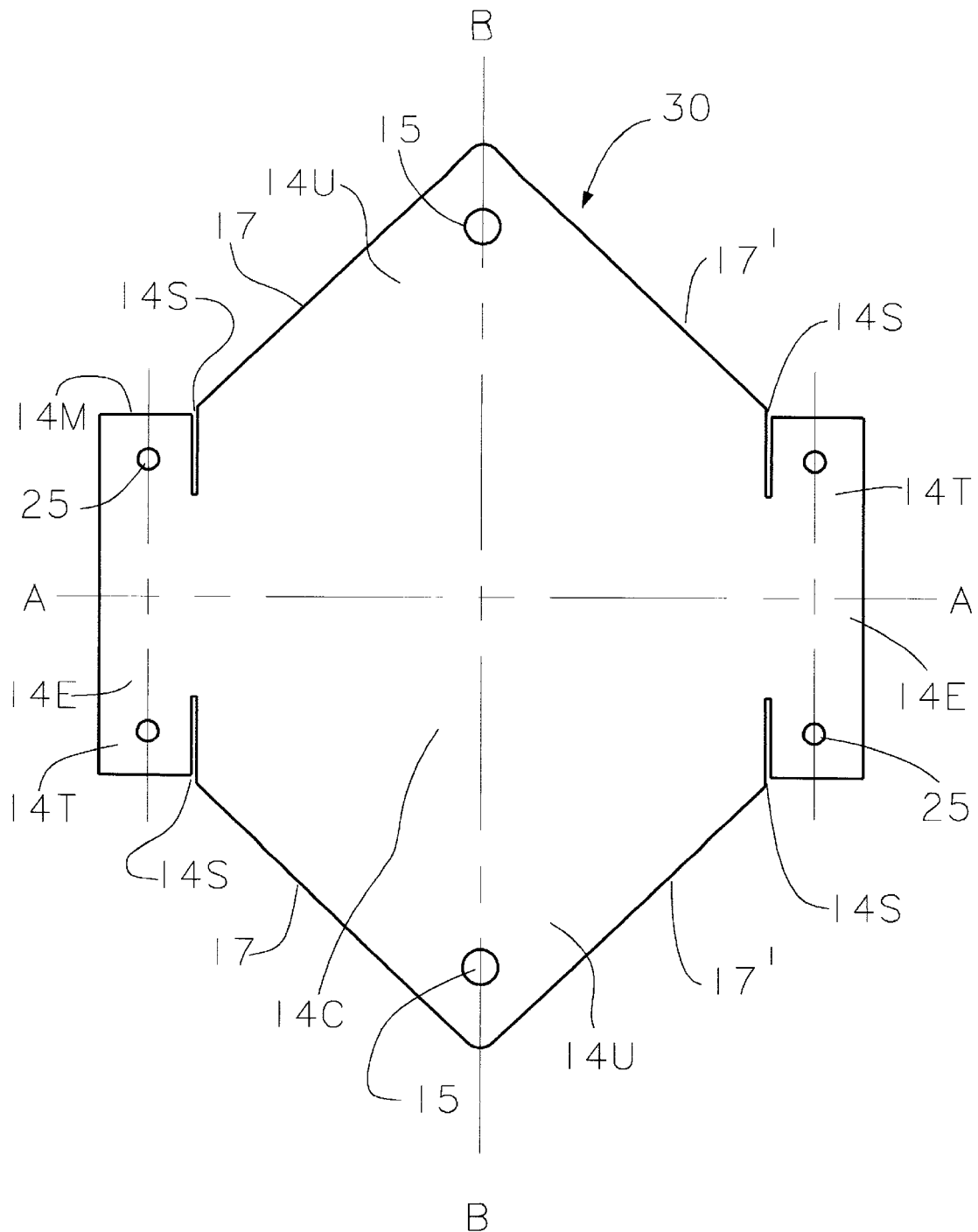
FIG. 5 is a plan view of a flat saddle blank prior to being bent to form a U-shaped strap for incorporation into the invention.
Figure 6:
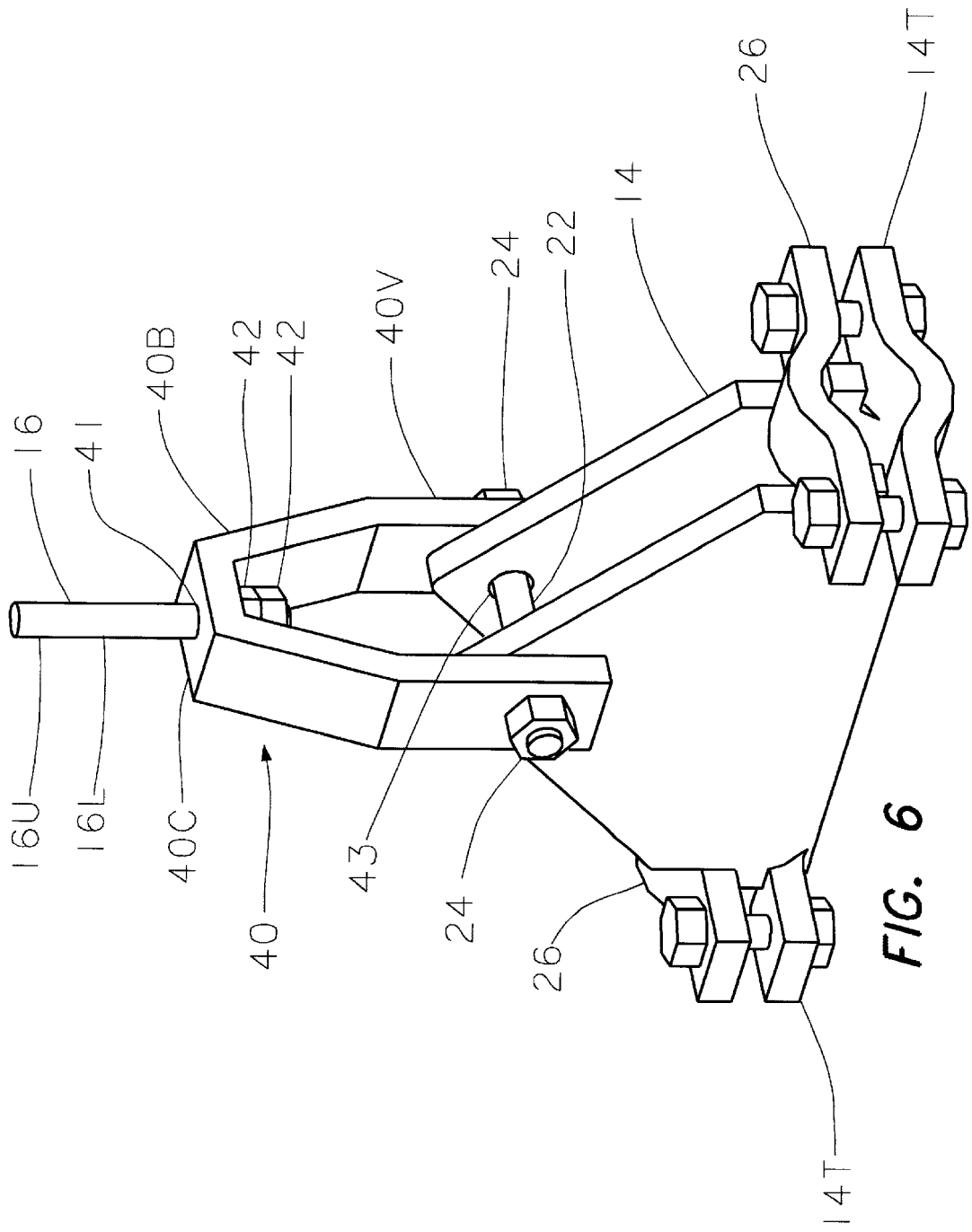
FIG. 6 is an isometric view of a saddle hanger support bracket suspended from a hanger rod and supporting a strap.

A preferred embodiment of the saddle hanger, denoted generally by the numeral 10, is shown in FIG. 1 supporting plastic pipe 20 and suspended from a horizontal I-beam 12. The saddle hanger 10 includes a U-shaped strap 14 formed by bending a flat saddle blank 30, such as shown in FIG. 5, so that it runs down one side of a pipe 20, underneath the pipe, and up the opposite side of the pipe. The saddle blank 30 has two support portions 14U oppositely and symmetrically disposed about a longitudinal axis A and joined by a central rectangular portion 14C. Each support portion 14U has a support aperture 15 located on lateral axis B for receiving a transverse bolt 22, which bolt 22 secures the strap 14 by nuts 24 to a saddle hanger support 40, as may be seen in FIG. 6. The saddle hanger support bracket 40 includes a pair of laterally spaced and oppositely disposed vertical legs 40V, each vertical leg being joined to a horizontal central portion 40C by an oblique leg 40B. Each vertical leg 40V has an aperture 43 for receiving bolt 22. The horizontal central portion 40C has a hole 41 to receive a lower, threaded end 16L of the vertical hanger rod 16 to which it is secured by a pair of nuts 42, 42'. An upper end 16U of the hanger rod 16 is secured to an I-beam C-clamp 18 attached to an I-beam 12.

Referring again to FIG. 5, the saddle blank 30 further includes a pair of ears 14E oppositely and symmetrically disposed about lateral axis B and joined to the central portion 14C. Preferably, the support portions 14U are tapered oppositely and laterally inward from lateral axis B toward the ears 14E, such that the lateral margins 17, 17' of support portions 14U are symmetric with respect to axes A and B. Each ear 14E is partially separated from central portion 14C by a pair of oppositely-directed lateral slits 14S cut from lateral margins 17, 17' part way toward the longitudinal axis A, thereby defining ear tab portions 14T. The lateral, uncut distance between each pair of slits 14E is about equal to the outer diameter D of the pipe 20. Each ear tab portion 14T has an aperture 25. Referring now to FIGS. 2–5, the saddle blank 30 is shown incorporated into the invention and with the central portion 14C thereof bent about longitudinal axis A to form the U-shaped strap 14 of longitudinal length L. The ear tabs 14T, however, by virtue of the slits 14S, remain horizontal and unbent, and extend laterally away from the strap 14. In this configuration, each of the ears 14E, including the ear tabs 14T, forms a pipe clamp base. A clamp cover 26 is provided to overlie each clamp base to which it corresponds in plan view and end view. Each clamp cover 26 has a pair of apertures 27 that align with corresponding apertures 25 of the ears 14E for receiving bolts 28 that secure the clamp covers 26 and ears about a pipe 20 by nuts 32. Thus, the ears 14E in combination with the clamp covers 26, bolts 28 and nuts 32 provide a clamp at each of the longitudinally opposite ends of the strap 14, thereby securing a pipe 20 within the strap 14.

The saddle blank 30 and clamp cover 26 are preferably made from steel sheet and with dimensions suitable for some chosen outer diameter D of pipe, and then bent to U-shape to accommodate that diameter; provided that the longitudinal length L of the strap 14 thereby formed should be several times as large as the pipe outer diameter. The hanger 40 is likewise preferably cut and formed from steel sheet.

Thus, it should be evident that an apparatus according to the concepts of the present invention has been shown and described in sufficient detail to enable one of ordinary skill in the art to practice the invention. Since various modifications in detail, material and arrangements of parts are within the spirit of the invention herein disclosed and described, the scope of the invention should be limited solely by the scope of the claims.

I claim:

1. A saddle hanger for a run of plastic pipe suspended from an overhead structure, comprising:
    a U-shaped strap, which strap is formed by bending a central, rectangular portion of a saddle blank about a longitudinal axis, said blank having two apertured support portions joined by the central portion, and a pair of ears oppositely and symmetrically disposed about a lateral axis through the central portion, each of said ears being partially separated from the central portion by a pair of oppositely-directed lateral slits thereby defining laterally extending tabs and forming a pipe clamp base;
    a pair of clamp covers, each clamp cover corresponding in plan view and end view to an ear that it overlies in mating relationship;
    means for attaching the clamp covers to the ears when pipe is supported and enclosed by the strap; and
    means attached to the strap for suspending the strap from an overhead structure;
wherein the strap is of sufficient length to substantially minimize droop in the run of plastic pipe supported by the saddle hanger.

2. The saddle hanger of claim 1, wherein each tab has an aperture and each clamp cover has a corresponding aperture for alignment with an aperture of a tab, and the means for attaching the clamp covers to the ears are threaded bolt and nut combinations.

3. The saddle hanger of claim 2, wherein the means attached to the strap for suspending the strap from an overhead structure includes a saddle hanger support bracket having a pair of laterally spaced and oppositely disposed vertical legs, each vertical leg being joined to a horizontal central portion, each vertical leg having an aperture, and a transverse bolt for insertion through the apertures in the vertical legs and through apertures in the support portions of the strap.

4. A saddle hanger for a run of plastic pipe suspended from a horizontal I-beam, comprising:
    a U-shaped strap, which strap is formed by bending a central, rectangular portion of a saddle blank about a longitudinal axis, said blank having two apertured support portions joined by the central portion, and a pair of ears oppositely and symmetrically disposed about a lateral axis through the central portion, each of said ears being partially separated from the central portion by a pair of oppositely-directed lateral slits thereby defining laterally extending tabs and forming a pipe clamp base;
    a pair of clamp covers, each clamp cover corresponding in plan view and end view to an ear that it overlies in mating relationship;
    threaded nut and bolt combinations for attaching the clamp covers to the ears when pipe is supported and enclosed by the strap;
    a saddle hanger support bracket having a pair of laterally spaced and oppositely disposed vertical legs, each vertical leg being joined to a horizontal central portion, each vertical leg having an aperture;
    a transverse bolt for insertion through the apertures in the vertical legs and through apertures in the support portions of the straps;
    a C-clamp for attachment to the I beam; and
    a hanger rod having an upper end attached to the C-clamp and a lower end attached to the bracket;
wherein each tab has an aperture and each clamp cover has a corresponding aperture for alignment with an aperture of the tab, and the strap is of sufficient length to substantially minimize droop in the run of plastic pipe supported by the saddle hanger.

* * * * *